United States Patent
Bergeron et al.

(10) Patent No.: US 7,063,827 B2
(45) Date of Patent: Jun. 20, 2006

(54) PROCESS FOR PRODUCING HYDROGEN CYANIDE

(75) Inventors: David Mark Bergeron, Galveston, TX (US); Michael Stanley DeCourcy, Houston, TX (US); Aaron Angel Quintanilla, Houston, TX (US); Paul Francis Valerio, Yardley, PA (US); James Woodrow Vinson, Jr., Houston, TX (US); David Alec Williams, Houston, TX (US)

(73) Assignee: Rohm and Haas Company, Philadelphia, PA (US)

( * ) Notice: Subject to any disclaimer, the term of this patent is extended or adjusted under 35 U.S.C. 154(b) by 167 days.

(21) Appl. No.: 10/653,323

(22) Filed: Sep. 2, 2003

(65) Prior Publication Data

US 2004/0042952 A1    Mar. 4, 2004

Related U.S. Application Data

(62) Division of application No. 09/847,124, filed on May 2, 2001, now Pat. No. 6,649,137.

(60) Provisional application No. 60/206,419, filed on May 23, 2000.

(51) Int. Cl.
*C01C 3/02* (2006.01)

(52) U.S. Cl. .................. 423/372; 423/374; 423/376

(58) Field of Classification Search ................ 422/240, 422/241; 423/372, 374, 376, 659
See application file for complete search history.

(56) References Cited

U.S. PATENT DOCUMENTS

| | | | |
|---|---|---|---|
| 1,934,838 A | 11/1933 | Andrussow | |
| 2,338,506 A | 1/1944 | Griswold | ........................ 48/65 |
| 3,269,857 A | 8/1966 | Stavrolakis et al. | .......... 117/95 |
| 3,948,610 A | 4/1976 | Sutcliffe et al. | ........... 23/288 K |
| 4,490,334 A * | 12/1984 | Peterson | ....................... 422/241 |
| 5,063,028 A * | 11/1991 | Humble et al. | ............. 422/144 |
| 5,169,604 A | 12/1992 | Crothers, Jr. | ................ 422/179 |
| 5,496,525 A * | 3/1996 | Lietz et al. | .................. 422/241 |
| 5,820,834 A | 10/1998 | DiGiovanni et al. | ......... 422/179 |
| 5,866,079 A | 2/1999 | Machida et al. | ............. 422/179 |
| 5,904,906 A | 5/1999 | Vogel et al. | ................. 422/189 |
| 5,958,273 A * | 9/1999 | Koch et al. | .................. 219/651 |
| 6,015,540 A | 1/2000 | McAdams et al. | ........... 423/659 |
| 6,096,106 A * | 8/2000 | Ruhl et al. | ................. 48/197 R |
| 6,162,404 A | 12/2000 | Tojo et al. | ................... 422/179 |
| 6,177,054 B1 * | 1/2001 | Bartels | ........................ 422/240 |

(Continued)

FOREIGN PATENT DOCUMENTS

DE          2204539          8/1973

(Continued)

*Primary Examiner*—Wayne A. Langel
(74) *Attorney, Agent, or Firm*—Marcella Bodner; Alan Holler (57) ABSTRACT

A conical reactor head for use in chemical processes or other systems is provided. The reactor head includes a robust internal insulator to boost efficiency while maintaining safety by allowing the reactor head to self-radiate at high temperatures. The reactor head also includes a plurality of support lugs to protect its bottom flange from scratches or other damage when the reactor head is set on the ground. The reactor head is adapted to connect to a catalyst-containing barrel which is specially designed to facilitate easy installation and removal of catalysts or other equipment from outside the barrel. The reactor may be coupled with a rotation vane to induce laminar flow at the inlet of the reactor to increase reactor efficiency and prolong catalyst life.

7 Claims, 9 Drawing Sheets

U.S. PATENT DOCUMENTS

| | | | |
|---|---|---|---|
| 6,217,832 B1 | 4/2001 | Betta et al. | 422/179 |
| 6,221,327 B1 * | 4/2001 | DeCourcy et al. | 423/376 |
| 6,485,852 B1 * | 11/2002 | Miller et al. | 429/17 |
| 2001/0009651 A1 | 7/2001 | Laricchia | |
| 2002/0164278 A1 | 11/2002 | Vetter et al. | |

FOREIGN PATENT DOCUMENTS

| | | | | |
|---|---|---|---|---|
| EP | 0358475 | * | 3/1990 | 422/241 |
| EP | 1065467 A2 | | 3/2001 | |
| WO | WO 97/09273 | | 3/1997 | |

* cited by examiner

PROCESS FOR PRODUCING HYDROGEN CYANIDE

CROSS REFERENCE TO RELATED PATENT APPLICATIONS

This non-provisional application is a divisional of non-provisional U.S. Patent Application No. 09/847,124 filed May 2, 2001, now U.S. Pat. No. 6,649,137 benefit of which is claimed under 35 U.S.C. §120 and which in turn claims benefit under 35 U.S.C. §119(e) of U.S. provisional Application No. 60/206,419 filed May 23, 2000, priority benefit of which is also claimed for the present divisional application.

This invention relates generally to high-temperature industrial processes, and more particularly, to a reactor apparatus and its use in associated processes.

The production of chemicals such as hydrogen cyanide and nitric acid using a reactor has been known for some time. For example, the one-stage synthesis of hydrogen cyanide from ammonia and a hydrocarbon gas in which heat is supplied by simultaneous reactions with air in the presence of a platinum metal catalyst was disclosed by Andrussow in U.S. Pat. No. 1,934,838. Numerous modifications and improvements relating to this process have been described in other patents.

To promote efficiency, often an insulator is added to the exterior of the reactor to prevent heat loss. However, the materials comprising the reactor limit the temperatures at which it can safely operate. Sometimes a water jacket is incorporated with the reactor to prevent overheating of the reactor and a potential failure of the vessel. In the event of an interruption of service to the water jacket, temperatures may rise in the externally-insulated reactor to a level which causes the reactor or the flanged connections or other vessel-components to fail, allowing hazardous chemicals to be released into the atmosphere. The external insulator, while increasing efficiency, may also increase the likelihood of a reactor failure. There have been some attempts to insulate reactors internally with refractory materials, but typically refractory materials are very susceptible to cracking in response to thermal and mechanical shocks, which makes it difficult or impossible to start and stop the processes or remove the reactor head for maintenance without damaging the refractory. It is also extremely difficult to maintain a refractory in suspension, such as on the inside surface of a domed or conical reactor head, because refractories have relatively low tensile strength.

Figure 1:
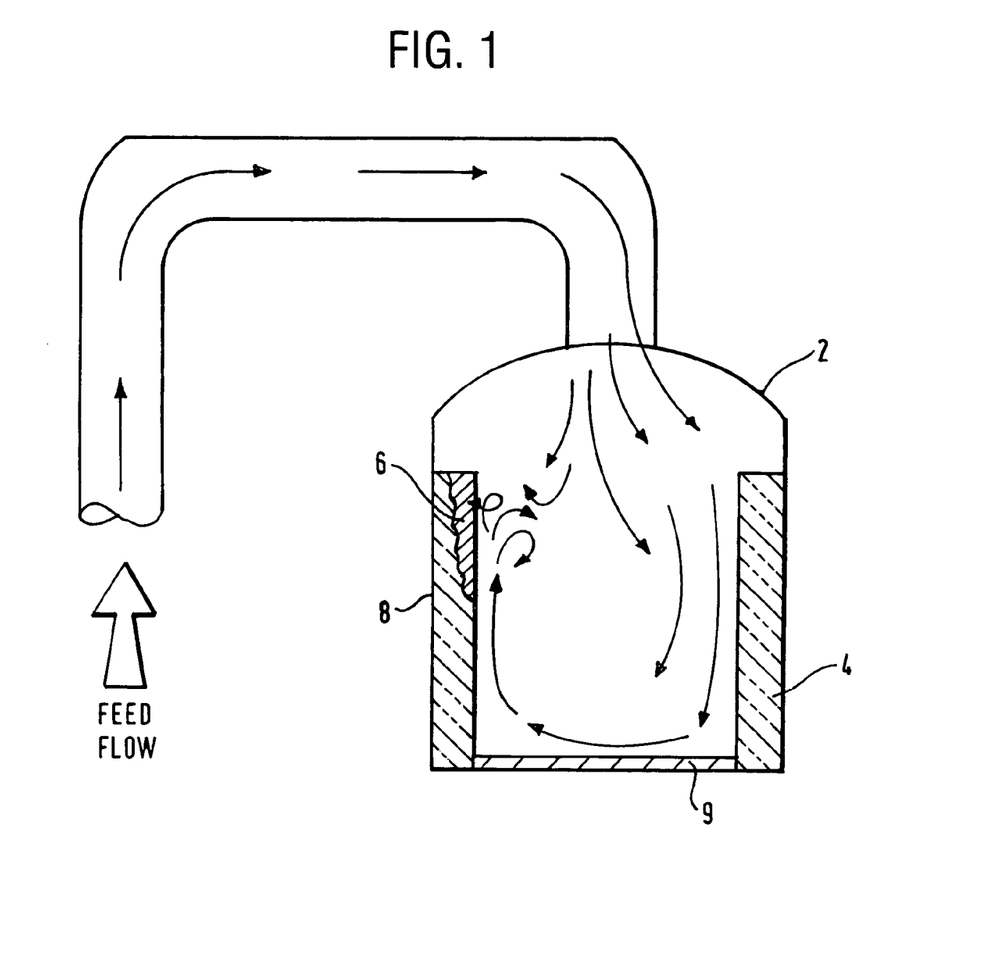
FIG. 1 is a view of a prior art reactor system.

In addition, conventional reactor designs such as the system shown in FIG. 1 exhibit a poor flow distribution characterized by flow separations. As shown in FIG. 1, a poor flow distribution entering reactor 2 with a refractory 4 may cause an upflow on the left side of reactor 2, resulting in decomposition and soot accumulation 6 on wall 8. The jet effect of turbulent flow as shown in FIG. 1 may also result in shorter catalyst life as the flow may utilize only a limited portion of catalyst 9. Additionally, in processes containing highly flammable feed mixtures, such as oxygen-enriched HCN or oxygen enriched ammonia oxidation reactors, the flow distribution depicted in FIG. 1 creates a significant potential for flashbacks and detonations.

Further, reactor heads typically include a large weld-neck or lap joint flange for connection to a barrel, exchanger, or other apparatus which may support the reactor head. The large weld neck or lap joint flange is often very expensive to design and produce and the sealing surface must be carefully maintained to ensure a proper seal between the reactor and, for example, the barrel. The maintenance of the connection surface is very important when the reactor is in operation and contains potentially hazardous, high temperature chemicals such as the HCN present in the Andrussow process. When it becomes necessary to move the reactor head for maintenance or other reasons, operators must be extremely careful to protect the flange from damage so that the reactor can be quickly put back into service. Often an operator will simply set the reactor on a block of wood, a pad, or some other material to protect the flange; and although a block of wood or other pad may sometimes be sufficient to protect the flange from damage when properly placed, if the operator fails to block the flange and sets the reactor head directly onto typical plant grating, the weight of the reactor head on the flange surface will most likely render it unusable (if the flange surface is scratched or warped, it will not seal properly).

Finally, the physical elevation of a typical barrel upon which the reactor head rests creates a difficulty in inserting and removing items such as catalysts, distributors, supports, or any other assemblies intended to be placed inside the barrel. Often the wall of the barrel is four feet high or more, requiring an operator to climb onto a platform, over the wall, and physically enter the barrel to install or exchange the catalyst. Not only does it take time to climb into and out of the barrel, but the barrel is classified as a confined space, and entry into a confined space requires the acquisition of permits, a supply of breathing air, availability and attention of another worker to serve as hole watcher, and sometimes other expensive and time-consuming safety precautions. There is a perceived need for a design that eliminates the need for these precautions and eases the installation of the catalyst.

The present invention is directed to overcoming, or at least reducing the effects of, one or more of the issues set forth above.

In one embodiment an apparatus for a high-temperature industrial process includes at least one flanged connection, with at least one flange of the at least one flanged connection protected from mechanical damage by at least one support lug attached to the at least one flange is disclosed. The apparatus of may further include a cooling jacket attached to the at least one flange, the cooling jacket being made of a ½ pipe.

In another embodiment there is described an apparatus for a high-temperature industrial process including at least one flanged connection, wherein the flange is cooled by an attached ½ pipe cooling jacket.

In some embodiments an apparatus for a high-temperature industrial process includes an inlet piping section with a first cross-sectional dimension, a downstream process section with a second cross-sectional dimension, and an inlet transition section connecting the inlet piping section and downstream process section, with the transition section including internal insulation made of refractory ceramic fiber. The second cross-sectional dimension may be larger than the first cross-sectional dimension, and the internal insulation may form a conical interior surface. In addition, the inlet transition section may be formed to a domed geometry. The transition section may be a reactor head including a flanged connection to the downstream process section.

In some embodiments there is included one or more sight glass nozzles. A laminar velocity profile may also achieved in the downstream process section using at least one of: a sufficient length of straight pipe comprising the inlet piping section to provide laminar flow at an upstream end of the inlet transition section; at least one CRV disposed within the inlet piping section; an LAD at the upstream end of the inlet transition section; and an EHD at the upstream end of the inlet transition section.

Another embodiment for a high temperature industrial process includes a process section having a first cross-sectional dimension, outlet piping having a second cross-sectional dimension smaller than the first cross-sectional dimension; and an outlet transition section connecting the outlet piping section and the process section with an internal surface of the outlet transition section which is conical.

Still another embodiment for a high-temperature industrial process includes a reactor head having a bottom flange, and a downstream process section with a top flange where a working elevation of the downstream process section top flange is between about 2.0 and 3.5 feet.

Another embodiment of the present invention includes an inlet piping section, an inlet transition section, a process section, an outlet transition section, and an outlet piping section where internal insulation is included in one or more of the apparatus sections, and where the insulation comprises refractory ceramic fiber. In this embodiment the inlet transition section further includes a conical interior surface, and the outlet transition section further includes a conical interior surface. The apparatus may further include a flanged connection having first and second flanges between the inlet transition section and the process section and at least one of first and second flanges includes a cooling jacket attached thereto.

Also, there is described a process of producing hydrogen cyanide including the steps of: providing at least one hydrocarbon, at least one nitrogen containing gas, and at least one oxygen containing gas, reacting the at least one hydrocarbon, at least one nitrogen containing gas, and at least one oxygen containing gas in an apparatus to form hydrogen cyanide, and supplying heat by a simultaneous combustion reaction with the at least one oxygen containing gas in the apparatus; where the apparatus comprises: at least one flanged connection wherein at least one flange of the at least one flanged connection is protected from mechanical damage by at least one support lug attached to the at least one flange.

There is disclosed a process of producing hydrogen cyanide including: providing at least one hydrocarbon, at least one nitrogen containing gas, and at least one oxygen containing gas; reacting the at least one hydrocarbon, at least one nitrogen containing gas, and at least one oxygen containing gas in an apparatus to form hydrogen cyanide, and supplying heat by a simultaneous combustion reaction with the at least one oxygen containing gas in the apparatus. In this process the apparatus may include an inlet piping section with a first cross-sectional dimension, a downstream process section with a second cross-sectional dimension, an inlet transition section connecting the inlet piping section and downstream process section, where the transition section comprises internal insulation comprising refractory ceramic fiber.

In one embodiment there is disclosed an apparatus including a reactor head and internal insulation, wherein the insulation includes a refractory ceramic fiber. The reactor head is adapted to connect with a fluid stream to facilitate a chemical process. In this embodiment an angle between a conical reactor head wall and a vertical line is less than about 25°. The insulation may be held in position by at least one sleeve extending through both the conical reactor and the insulation and the insulation may be further supported by a collar extending through the reactor head inlet. The reactor head may be cone-shaped or dome shaped. The apparatus may be used for producing hydrogen cyanide or other products.

In one embodiment the apparatus further includes a cooling jacket disposed around the reactor head. The cooling jacket is made of a half-pipe attached to an outer surface of the conical reactor. It is contemplated that the apparatus may include the use of flow straightening vanes upstream of the reactor head.

In one embodiment there is disclosed a reactor head, at least one flange having a circumferential surface and a coupling surface, the coupling surface being adapted to be coupled with a mating flange in a chemical process unit, at least one support lug attached to the at least one flange and capable of supporting the reactor head, wherein the at least one support lug extends from the circumferential and coupling surfaces such that a clearance is created between the coupling surface and the support lugs. Contemplated with this embodiment may be one or more additional support lugs attached to the at least one flange and capable of supporting the reactor head. The at least two support lugs may be generally U-shaped and extend around a cooling jacket mounted to the at least one flange. The at least two support lugs may also have a generally circular hole drilled therethrough to facilitate cooling of the at least two support lugs.

In one embodiment there is disclosed a reactor head, a catalyst-bearing barrel adapted to be coupled to the reactor head, wherein the catalyst-bearing barrel exhibits a working vertical elevation between about 2.0 and about 3.5 feet and is adapted to facilitate acceptance of a catalyst or other apparatus provided by one or more operators standing outside the diameter of the barrel when the catalyst-bearing barrel is uncoupled from the reactor head. In some applications, the operators might use a hoist or other tools to assist in the installation of a catalyst or other apparatus, but the operators themselves can remain outside of the barrel.

In one embodiment there is an apparatus disclosed including a reactor head, a catalyst-bearing barrel adapted to be coupled to the reactor head, and at least one thermocouple nozzle having an internal passageway adapted to house a thermocouple or other instrumentation, mounted in the side of the catalyst-bearing barrel at a non-normal angle such that there is no direct line of sight between the catalyst elevation and the internal passageway.

There is also disclosed a process of producing hydrogen cyanide which includes providing at least one hydrocarbon, at least one nitrogen containing gas, and at least one oxygen containing gas, reacting the at least one hydrocarbon, at least one nitrogen containing gas, and at least one oxygen containing gas in a reactor to form hydrogen cyanide, and supplying heat by a simultaneous combustion reaction with the at least one oxygen containing gas in the reactor. In this process it is contemplated that the reactor includes a reactor head, a catalyst-containing barrel member, and insulation insertable into the reactor head, with the insulation comprising a refractory ceramic fiber.

The foregoing and other features and aspects of the invention will become further apparent upon reading the following detailed description and upon reference to the drawings in which:

FIG. 20 is a representation of a Non-Selective Catalytic Reduction (NSCR) NOx abatement unit configured in accordance with the present invention While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Figure 2:
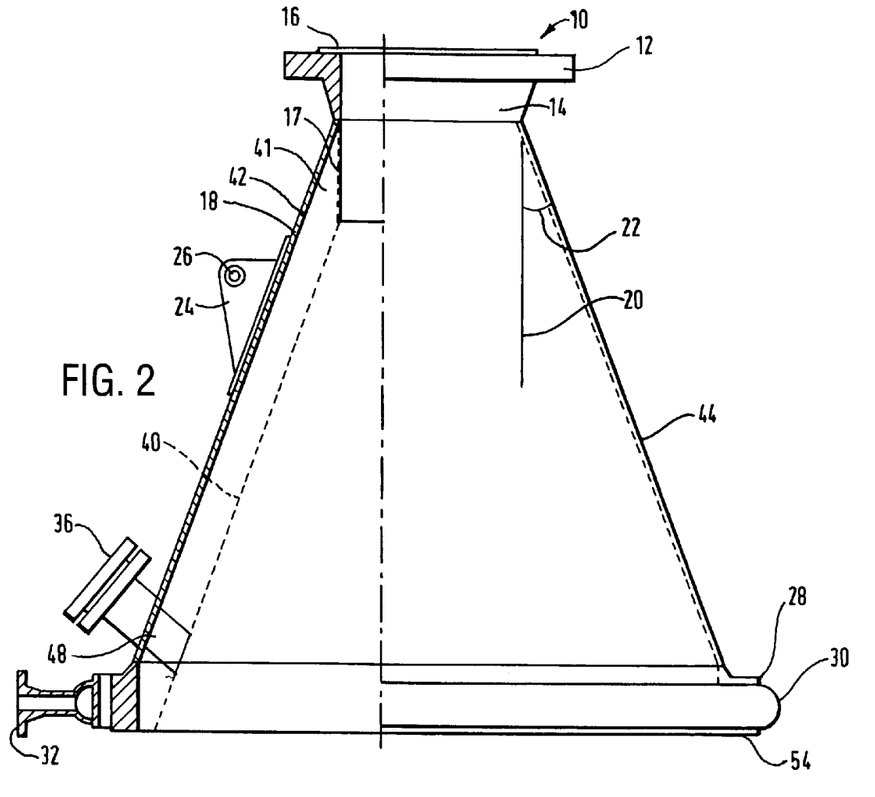
FIG. 2 is a front view, shown partially in cross-section, of one embodiment of a conical reactor head in accordance with the present invention.
Figures 4, 4A:
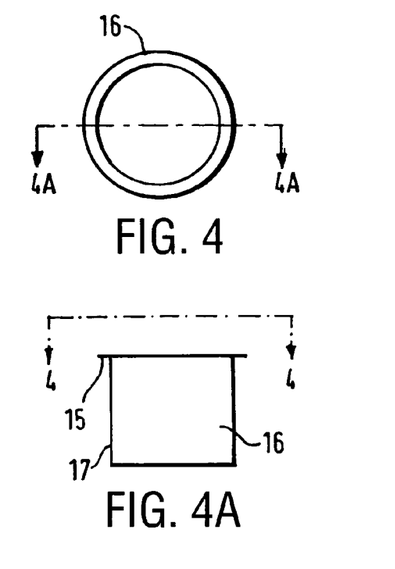
FIG. 4 is a top view of a collar in accordance with the present invention.
FIG. 4a is a front view of the collar shown in FIG. 4.

Turning now to the figures, and in particular to FIG. 2, a conical reactor head 10 in accordance with one embodiment of the invention is disclosed. Conical reactor head 10 includes a top flange 12 adapted to connect with a mating flange 13 (shown in FIG. 16) in a chemical process. Top flange 12 is adjacent a reactor inlet 14, which optionally has a rigid collar 16 placed concentrically therein. Collar 16 is shown more clearly in FIGS. 4 and 4a and typically comprises stainless steel. Collar 16 is generally cylindrical and exhibits a lip 15 that prevents the collar from falling into reactor head 10 and is sealable between top flange 12 and the mating flange 13. Collar 16 helps to hold insulation 40 (discussed in greater detail later in this specification) in place.

Figure 16:
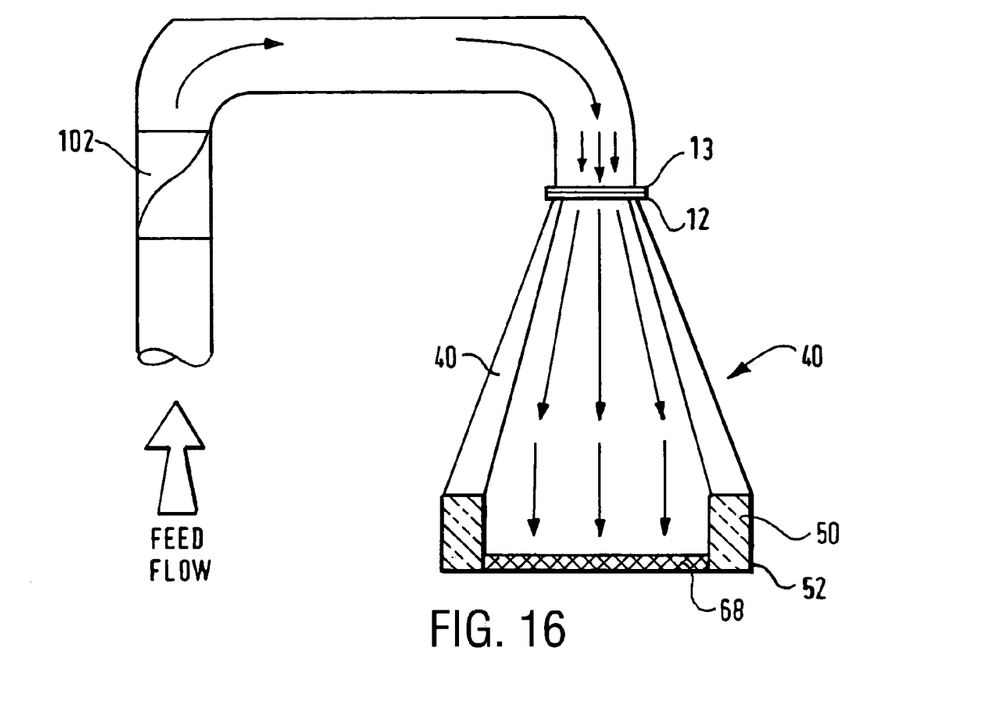
FIG. 16 is a perspective view of a system incorporating a conical reactor head and rotation vane in accordance with the present invention.
Figure 20:
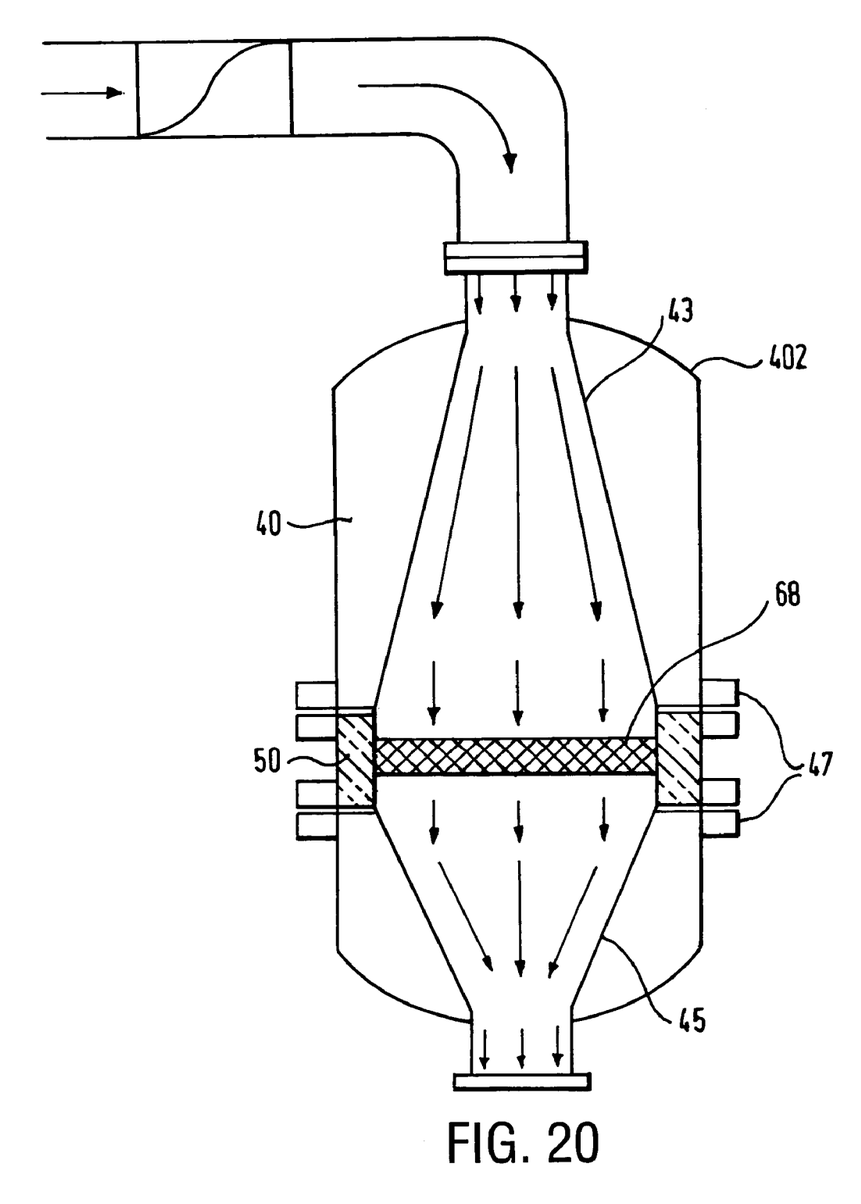

Inlet 14 is adjacent a conical side member 18. Side member 18 forms an expanding region and facilitates maintenance of laminar fluid flow from the inlet. If the flow is laminar at the inlet, the flow will tend to remain attached if angle 22 between side member 18 and a vertical line 20 is less than approximately 25°. In the embodiment shown in FIG. 2, angle 20 is approximately 21°. It will be understood that some variation of angle 22 is within the scope of the present invention, i.e. the angle can be anything less than about 25°, or any other angle that promotes attached laminar flow. Angle 22 may be effectively modified by varying the thickness of insulation 40 from top to bottom as well. It will also be understood that reactor head 10 may not be conical at all but could be any convenient shape coupled with a large angle diffuser (LAD) or an Elliptical Head Diffuser (EHD) to create a laminar flow profile similar to the shape of a cone (e.g. as shown in FIG. 20). Large Angle Diffusers and EHD's are available from Koch-Glitsch, Inc. Laminar flow offers the advantage of preventing flashback that may otherwise result in a turbulent flow/flow separation regime. Referring to FIG. 1 again, when backflows are created there is an increased risk of flashback and detonations that is not present in a laminar flow regime as shown in FIG. 16.

Figure 3:
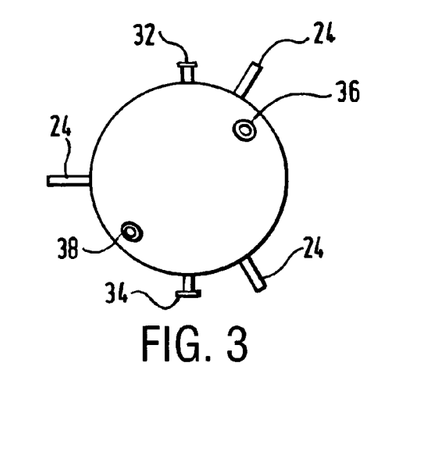
FIG. 3 is a top view of the design according to FIG. 2.

Mounted to side member 18 are a plurality of lifting lugs 24. Preferably, as shown in FIG. 3, three lifting lugs 24 are equally spaced about an outer surface 44 of side member 18. Lifting lugs 24 exhibit an eyelet 26 adapted to receive a hook, cable or other lifting system appendage (not shown). Lifting lugs 24 are designed to support the entire weight of reactor head 10, facilitating its transportation.

Figure 2A:
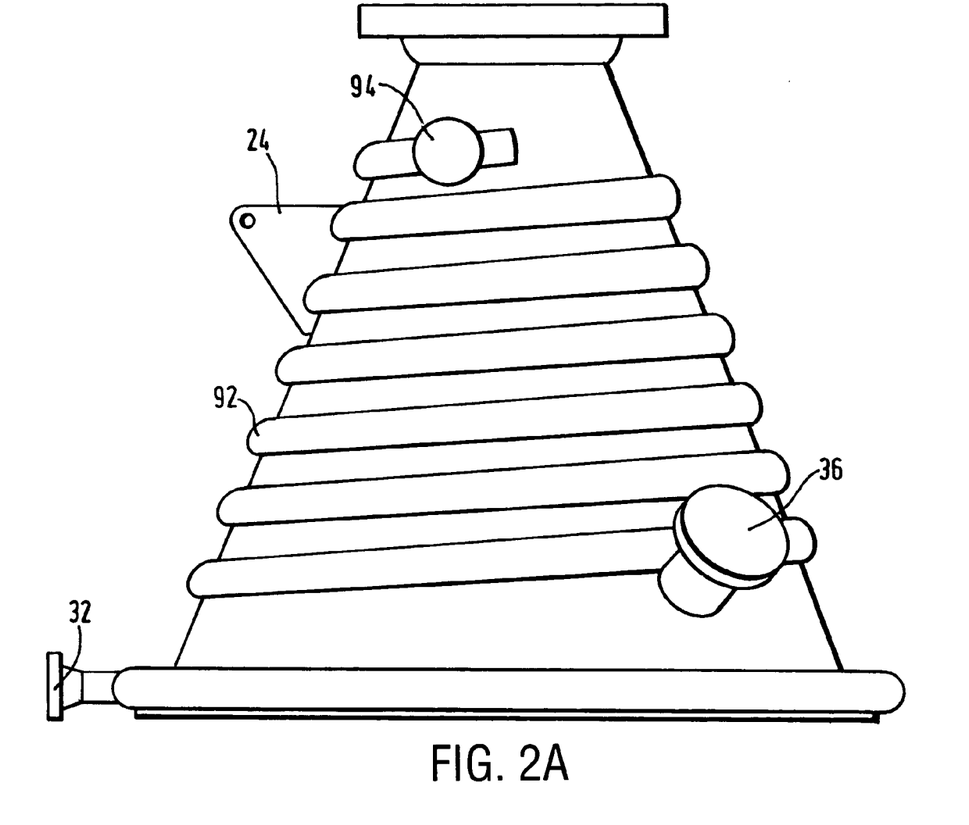
FIG. 2a is a perspective view of the embodiment shown in FIG. 2.
Figure 6:
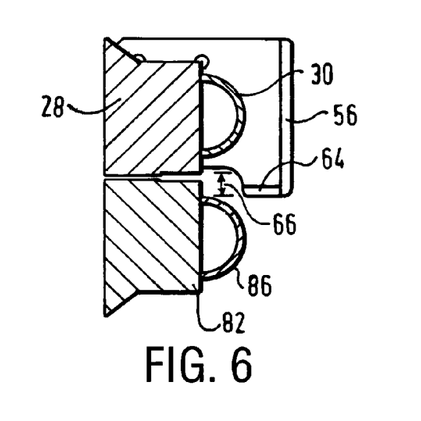
FIG. 6 is a side view taken along line A—A of the support lug shown in FIG. 5.

Side member 18 meets a bottom flange 28 opposite the attachment to top flange 12. Top and bottom flanges 12 and 28 are preferably weld-neck flanges, but other flanges such as lap joint flanges may also be used. One of skill in the art with the benefit of this disclosure will recognize that weld-neck flanges are especially useful with spiral wound gaskets (not shown) which require very high seating stresses; spiral wound gaskets are preferred in critical service applications such as HCN production. It will be understood that "top" and "bottom" as they are used to identify top flange 12 and bottom flange 28 refer only to the orientation of reactor head 10 as they appear in the Figures. The orientation of reactor head 10 may be modified to any suitable position. In the embodiment shown in FIG. 2, a flange cooling jacket 30 is attached to bottom flange 28. Flange cooling jacket 30 may comprise a half-pipe welded directly to bottom flange 28 as shown in FIGS. 2 and 6. Cooling jacket 30 includes an inlet 32 and an outlet 34. Outlet 34 is shown in FIG. 3. Side member 18 may also include a cooling jacket 92. Cooling jacket 92 is not shown in FIG. 2 but may be seen in FIG. 2a. Cooling jacket 92 includes an inlet (not shown) and an outlet 94. Cooling jacket 92 may also comprise a half-pipe welded directly to side member 18 in the configuration shown in FIG. 2a. These cooling jacket inlets/outlets comprise flanges connecting their associated cooling jackets to a cooling medium source by a stainless steel braided hose 91. In a preferred embodiment, some of the jackets may be connected in series—that is, the outlet flange of one jacket may be connected to the inlet flange of another jacket. I In some embodiments the inlet/outlet flanges may be eliminated altogether and replaced by continuous piping to a cooling medium source (not shown—this may be, for example, a water supply header). In some embodiments there are no cooling jackets associated with reactor head 10 at all.

Adjacent bottom flange 28 are a plurality of sight glass nozzles 36 and 38. A cross-section of sight glass nozzle 36 is shown in FIG. 2. FIG. 3 discloses in top view a preferred embodiment with both sight glass nozzle 36 and sight glass nozzle 38. In the alternative, only sight glass nozzle 36 is included with the reactor. In some embodiments the sight glasses are completely omitted. Sight glass nozzles 36 and 38 extend through side member 18 into the interior of reactor head 10. Sight glasses 36 and 38 enable an operator to view the internal reaction. Sight glass nozzles 36 and 38 may alternatively be used as sampling connections or as conduits for other instruments including, but not limited to, thermocouples, pressure indicators, and ignitors.

Reactor head 10 includes an internal insulation 40 adjacent the inner wall 42 of the reactor. Insulation 40 is preferably made from alumina and/or silica ceramic fiber and may also include a binder. For example, insulation 40 may comprise Pyrolite® ((includes binder) which is available from Rex Roto Corporation or K-mod ceramic fiber modules (does not include binder) which are available from Rath Performance Fibers Inc. The placement of insulation 40 inside reactor head 10 offers the advantage of increased efficiency by reducing heat loss without the dangers of overheating and reactor head failure associated with external insulators. While reactor head 10 and other conventional reactors may have cooling systems, in the event of a cooling system failure, the heat generated inside reactor 10 may cause the metal reactor to increase in temperature. The temperature may continue to rise until a flange or the reactor itself fails due to temperatures reaching the yield-point for the metal. When the reactor fails or a flange warps due to excessive temperatures, the potentially hazardous chemicals contained therein may be released. However, by utilizing only internal insulation 40 inside reactor head 10, reactor head 10 is allowed to act as a self-radiator, i.e., outer surface 44 is free to radiate heat to the atmosphere. This gives Reactor head 10 the advantage of self-limiting its own temperature. Although the temperature of reactor head 10 will increase beyond the normal operating temperature in the event of a cooling system failure, the ability to self-radiate provides a secondary cooling mechanism; eventually the radiation of heat from outer surface 44 of reactor 10 will equal the heat generated inside the reactor and a steady state will be reached. For example, in a HCN process employing insulation 40 inside reactor head 10, reactor head 10 is self-limiting at several hundred degrees Fahrenheit below the yield temperature of the metal. Therefore, the use of insulation 40 minimizes heat loss without compromising safety in the event of a cooling failure. In fact, in some embodiments it may be desirable to eliminate the use of a cooling system altogether. Previous reactors have included a refractory material internal to the reactor wall to minimize energy losses to the environment, but as discussed in the background, refractories are heavy, fragile, difficult to maintain, and susceptible to cracking due to mechanical and thermal shock. A conical head containing a refractory would be very difficult to create, and the refractory-bearing head could not be conveniently moved around for maintenance or other reasons without a significant possibility of cracking the refractory. Advantageously, the present invention contemplates the use of Pyrolite® or K-mod™ for insulation 40, which is light-weight, thermally and mechanically shock-resistant, and easy to install and maintain in a conical reactor. Insulation 40 may be conveniently manufactured in a conical shape to mate with reactor head 10 and slip into and out of the reactor without the risk of cracking. Pyrolite® and K-Mod™ are durable enough to allow the reactor to be lifted and transported without the significant extra precautions usually demanded by an internal refractory system. In the embodiment shown in FIG. 2, insulation 40 is substantially adjacent to inner wall 42 of reactor head 10, but in some embodiments insulation 40 is arranged such that a blanket (not shown) or an air gap (not shown) may exist between the insulation and inner wall 42.

Insulation 40 may be secured within reactor 10 by collar 16. Collar 16 extends into reactor head 10 and an outer collar surface 17 provides a rigid boundary against which an upper end 41 of insulation 40 rests. Collar 16 also ensures that gases introduced into and contained within reactor head 10 do not migrate behind insulation 40. In addition with, or alternative to, the use of collar 16, a sight glass sleeve 48 in each of sight glass nozzles 36 and 38 may extend through insulation 40 to hold the insulation in position. However, as shown in FIG. 16, insulation 40 is not required to be in suspension when reactor 10 is fully installed but instead may rest on a castable refractory 50 poured inside a barrel 52. Refractory 50 may alternatively comprise Pyrolite®, K-mod™, or even refractory brickwork.

Figure 5:
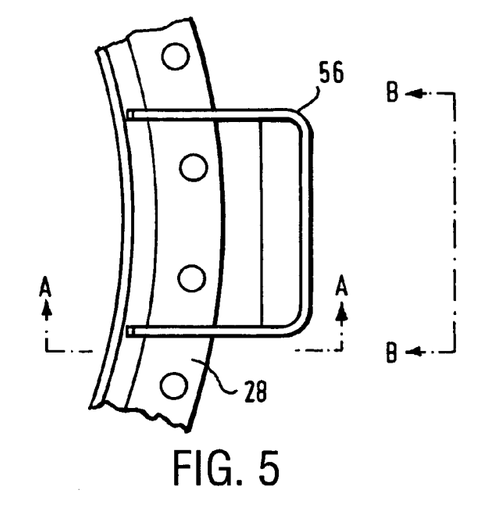
FIG. 5 is a top view of a support lug attached to a flange of the conical reactor head in accordance with one embodiment of the present invention.
Figure 8:
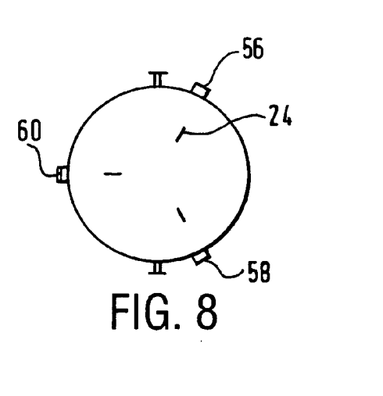
FIG. 8 is a top view of the reactor incorporating the design shown in FIG. 5.

Because of the hazards associated with chemical reactions under high temperature and pressure, bottom flange 28 must be carefully produced and maintained such that mating surface 54 is in condition to properly seal the connection of reactor head 10 to, for example, barrel 52. Reactor head 10 is not limited to use with barrel 52, however, but instead may be coupled directly to heat exchangers comprising integral barrels (not shown) or other non-barrel apparatus. Examples of several types of heat exchangers that may be used in combination with reactor head 10 are described in pending U.S. provisional patent application No. 60/141,769 which application is herein incorporated by reference. Because reactor head 10 may weigh in excess of 2,000 pounds, bottom flange 28 can be easily damaged or destroyed if the reactor weight is borne by mating surface 54. For at least this reason, a plurality of support lugs, for example U-shaped brackets 56, 58 and 60 are advantageously arranged equidistantly about the circumference of bottom flange 28. U-shaped bracket 56 is shown in a detailed top view in FIG. 5 and all three support lugs are seen in FIG. 8. It will be understood by one of skill in the art with the benefit of this disclosure that the number, spacing, and details of the support lugs embodied in the figures as U-shaped brackets may be varied. FIG. 5 discloses a generally U-shaped bracket 56 attached to bottom flange 28. U-shaped bracket 56 extends beyond the circumference of bottom flange 28 and flange cooling jacket 30.

Figure 7:
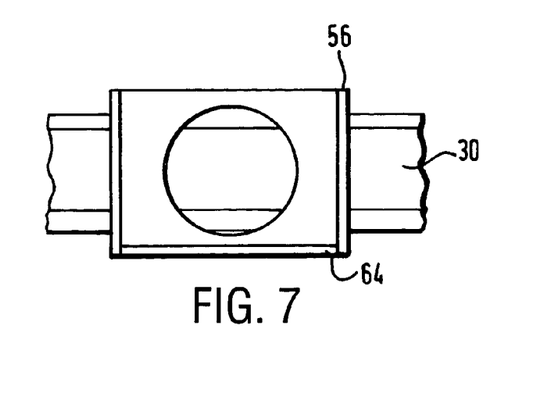
FIG. 7 is a front view taken along line B—B of the design according to FIG. 5.

Turning to FIG. 6, a side view of U-shaped bracket 56 is shown attached to bottom flange 28. In the figure, bottom flange 28 is shown adjacent a mating barrel flange 82. U-shaped bracket 56 exhibits a foot 64 that extends beyond mating surface 54 to create a clearance 66 between the bottom of the bracket and the mating surface. Clearance 66 may measure between ½ inch and 3 inches, preferably about 1¼ inches, but any other clearance may be created as necessary. It will be understood by one of skill in the art with the benefit of this disclosure that clearance 66 may be any dimension that protects mating surface 54 without interfering with the setting of reactor head 10 on barrel 52 or other mating apparatus. Clearance 66 advantageously provides protection for mating surface 54 when reactor 10 is placed somewhere other than on barrel 52. For example, if reactor 10 is set on the ground, there is no need to set anything under bottom flange 28 to protect mating surface 54 from scratches and/or other damage that may result from direct contact between the mating surface and the ground. U-shaped brackets 56, 58, and 60 are capable of supporting the full weight of reactor head 10 without permitting mating surface 54 to come into contact with the ground or other supporting surfaces. It will be understood by one of skill in the art with the benefit of this disclosure that in some multi-component embodiments, such as the reactor disclosed in EP847372 (A1), which is hereby incorporated by reference, a plurality of support lugs may be beneficially employed to protect multiple flanges. In reference to FIG. 7, U-shaped brackets 56, 58, and 60 may exhibit a circular hole to reduce the mass of each bracket and promote the cooling of each.

Figure 9:
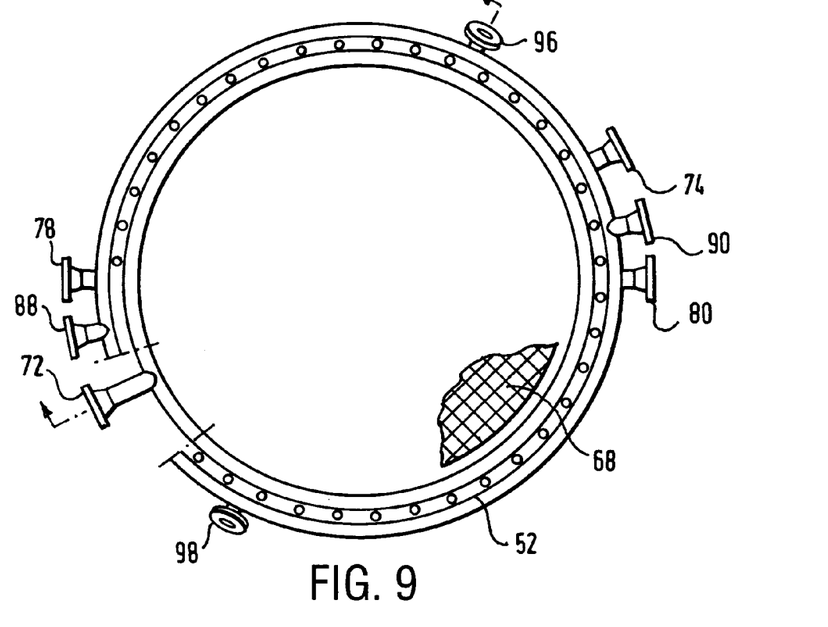
FIG. 9 is a top view of a barrel section in accordance with one embodiment of the present invention.
Figure 10:
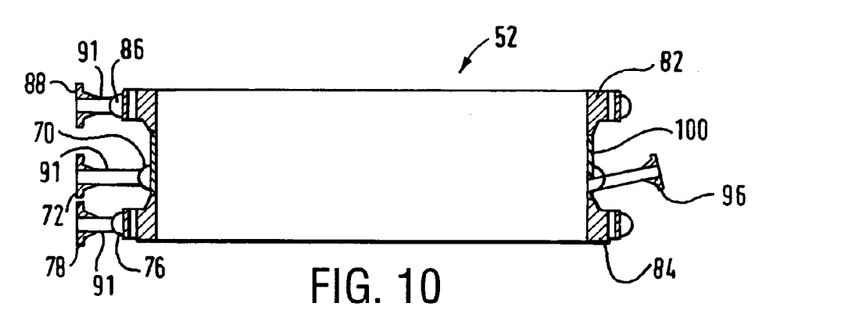
FIG. 10 is a cross-sectional view taken along line C—C of the design according to FIG. 9.

Turning next to FIGS. 9 and 10, barrel 52 is shown in some detail. Barrel 52 is generally cylindrical and may contain a catalyst 68. Barrel 52 is adapted to connect with reactor head 10. FIGS. 9 and 10 only display the barrel section, however. Barrel 52 includes a top barrel flange 82 and a bottom barrel flange 84. In some embodiments flange 84 may be omitted with a continuous connection between wall 100 and a heat exchanger (not shown) below. Barrel 52 also includes three cooling jackets (70, 76, and 86). Barrel cooling jacket 70 includes inlet 72 and outlet 74. Top barrel flange cooling jacket 86 incorporates its associated inlet 88 and outlet 90. Bottom barrel flange cooling jacket 76 includes its associated inlet 78 and outlet 80. Each of cooling jackets 70, 76 and 86 may comprise a half pipe welded to the barrel as shown in FIG. 10. Each of inlets 72, 74, 78, 80, 88, and 90 comprise flanges connecting their associated cooling jackets to a cooling medium source, (or they may be connected in series to one source) by a stainless steel braided hose 91. However, in some embodiments the inlet/outlet flanges may be eliminated altogether and replaced by continuous piping to a cooling medium source (not shown), and in still other embodiments there may be no cooling jackets at all.

Figure 19:
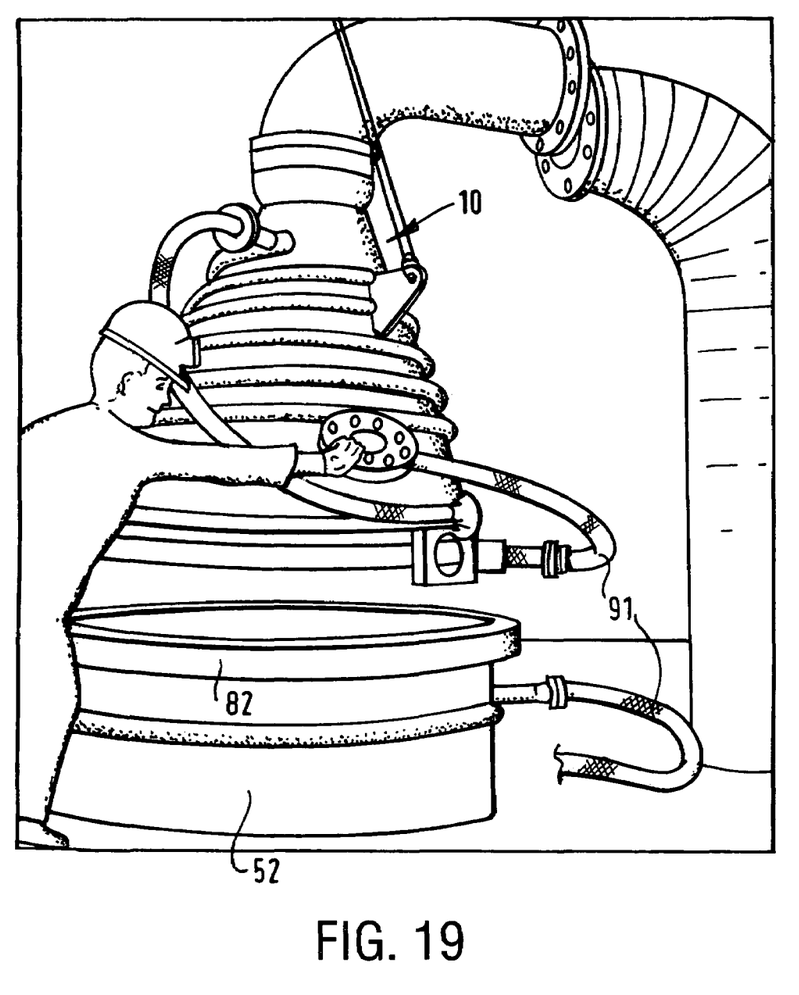
FIG. 19 is a photograph of the conical reactor according to FIG. 2 shown in proximity to an operator.

The elevation of barrel 52 is advantageously designed to facilitate easy installation and removal of items including, but not limited to, catalysts 68, distributors, supports, or other assemblies intended to be inserted into the barrel. As discussed in the background section, with a conventional barrel it is very difficult and time consuming to install the catalyst or other items. The barrel 52 disclosed in FIGS. 9 and 10 comprises a shortened dimension D1 of approximately 1.5 to 2.5 feet, preferable 1.75 feet, from the top barrel flange 82 to bottom barrel flange 84. This distance, when combined with, for example, an exchanger (not shown) results in a working elevation from either a floor (not shown) or platform to top barrel flange 82 of 2.0 to 3.5 feet, preferably 3.0 feet. At an elevation of 2.0 to 3.5 feet, the top barrel flange meets an average person at waist level and advantageously allows an average person to reach into barrel 52 to install or retrieve, for example, a catalyst from outside the barrel. FIG. 19 displays one embodiment of the invention in close proximity to an operator. As seen in the figure, an operator may conveniently reach into the barrel without climbing inside. As a result, entry into confined spaces is not required, obviating the need for the associated permits and precautions. There is also no need to use a stool or any other apparatus to enable the operator to reach into and change the catalyst or other internal items. Contemplating for example a catalyst, the catalyst may sit inside the barrel approximately one foot from top barrel flange 82, but the barrel may be adapted to receive the catalyst at any distance conveniently reached by an operator. The range of distances the catalyst may be set from top barrel flange 82 is considered to be from approximately three inches to 2 feet.

Barrel 52 may also exhibit a plurality of instrumentation nozzles 96 and 98 to facilitate monitoring conditions, such as temperature, within the reactor. Typically thermocouple wires are threaded into a reactor from above, which can be difficult with a large object such as conical reactor head 10. By advantageously feeding the thermocouples (not shown) through wall 100 of barrel 52, the installation is much easier and the thermocouple is readily accessible. Instrumentation nozzles 96 and 98 are adapted to house thermocouples and extend through barrel cooling jacket 70 to allow cooling of the nozzles. Instrumentation nozzles 96 and 98 are positioned at approximately the same elevation on the outside of barrel 52 as the catalyst. However, instrumentation nozzles 96 and 98 are arranged at a non-normal angle to wall 100 of barrel 52 to ensure that there is no direct line of sight to the catalyst radiation. Non-normal means that instrumentation nozzles 96 and 98 meet barrel wall 100 at an angle other than 90° or that the nozzles are not at a flat elevation with respect to the catalyst. In addition, nozzles 96 and 98 may have insulation inserted therein to further protect the thermocouples. In the disclosed embodiment, the angle between nozzle 96 and wall 100 is about 77°, but any other angle between 0 and 180°, with the omission of 90°, may be used. Much of the energy in a chemical reaction is transferred by radiation, and if the instrumentation nozzles 96 and 98 are normal to barrel 52 with a direct line of sight to the catalyst reaction, the heat may enter directly into the nozzles and melt the thermocouples (not shown) disposed within the nozzles. Therefore, instrumentation nozzles 96 and 98 are advantageously positioned near the catalyst reaction but not in a direct line of sight with the reaction, which prolongs thermocouple life.

Instrumentation nozzles 96 and 98 may alternatively be used for many other instruments including, but not limited to, process analyzer sample connections, pressure indicators, and ignitors.

Figure 11:
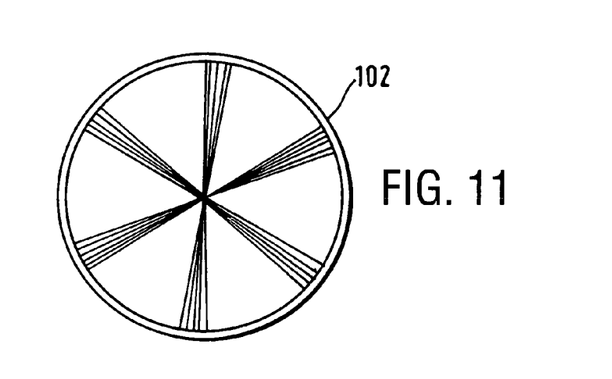
FIG. 11 is a front view of a rotation vane for use with the conical reactor of FIG. 2.
Figures 12, 13:
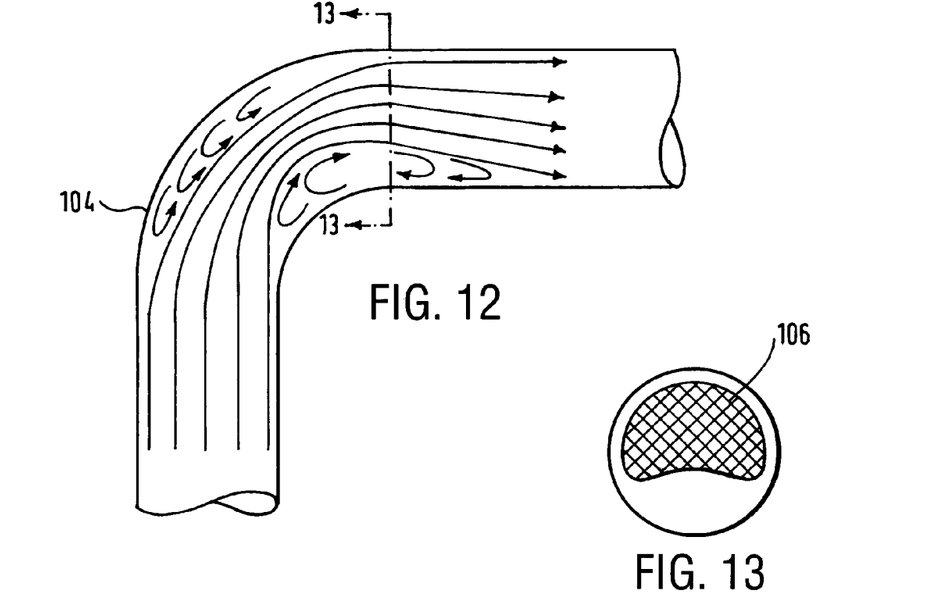
FIG. 12 is a diagrammatical view of fluid flow in a pipe without a rotation vane.
FIG. 13 is a cross-sectional view of the effective fluid flow according to FIG. 12.
Figures 14, 15:
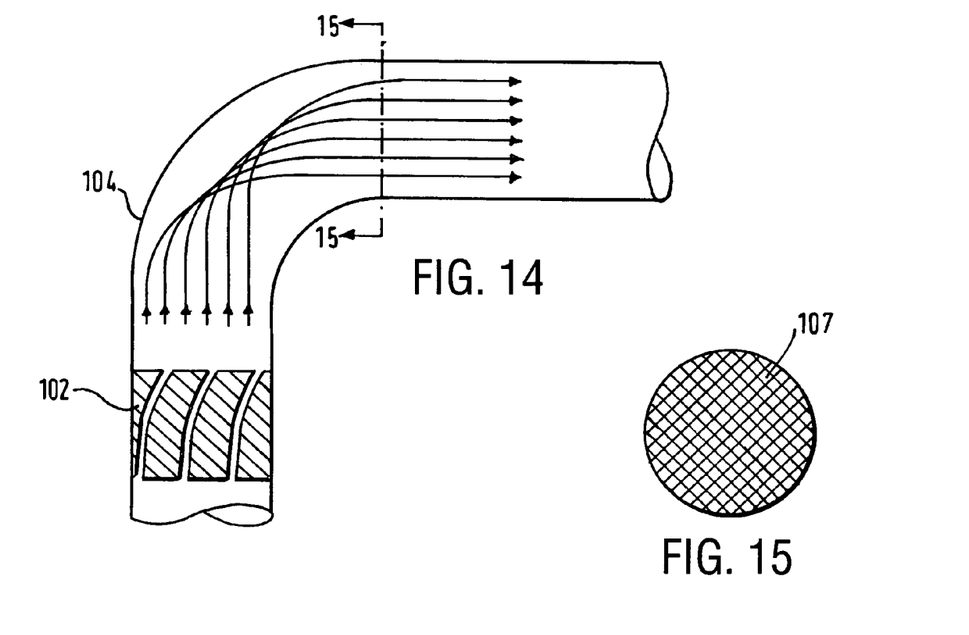
FIG. 14 is a diagrammatical view of fluid flow in a pipe with the rotation vane.
FIG. 15 is a cross-sectional view of the effective fluid flow according to FIG. 14.

Turning next to FIGS. 11–16, a flow straightening system for use in conjunction with reactor 10 is disclosed. Because of the extreme expense associated with precious metal and other catalysts it is desirable to induce flow over the entire surface area of the catalyst to increase its useful life. In a typical reactor system, the well known jet effect of fluids as they pass through a sudden expansion causes the majority of the fluids to maintain roughly the same diameter as the inlet pipe. When the fluid reaches the catalyst, typically the center area receives 80 to 90% of the flow while the catalyst areas nearest the walls are starved. In addition, upflow patterns such as the one exhibited in FIG. 1 may occur and result in reactant decomposition at the wall of the reactor. If a laminar flow can be induced in the inlet piping and the reactor exhibits a gradual expansion, the flow will remain attached to the walls of the reactor and direct a more even distribution of flow to the entire catalyst surface. An expansion angle of less than approximately 25° will normally maintain an attached laminar flow. In some cases laminar flow can be induced by providing at least ten straight pipe diameters immediately upstream of the inlet to a reactor, but typically space limitations require that there be a piping elbow less than the necessary ten pipe diameters upstream. In these typical limited-space applications, a flow straightener such as rotation vane 102 becomes necessary to induce laminar flow. Rotation vane 102 is known as a CRV® and is available from Cheng Fluid Systems, Inc. or Koch-Glitsch, Inc. It will be understood by one of skill in the art with the benefit of this disclosure that other flow straightening systems may also be used to induce laminar flow. FIG. 11 shows in front view rotation vane 102 as it may be used with reactor 2. FIG. 16 discloses the typical placement of rotation vane 102 in relation to reactor 10. Rotation vane 102 may be designed to compensate for two elbows as it is shown in FIG. 16, or a second rotation vane (not shown) may be used in addition to rotation vane 102. FIGS. 12–15 illustrate the effect of rotation vane 102 in operation. Without rotation vane 102, the velocity of the fluid as it passes around elbow 104 becomes non-uniform and flow separation occurs as shown in FIG. 12. The effective flow 106 is changed to resemble the resulting cross-section shown in FIG. 13. The non-uniform flow shown in FIG. 13 prevents an attached flow from being evenly distributed to the catalyst. Use of rotation vane 102, on the other hand, provides the flow pattern through elbow 104 shown in FIG. 14. After passing through rotation vane 102, the resultant flow velocities are uniform and laminar. FIG. 15 shows the uniform flow in cross-section 107. When a laminar flow is introduced to conical reactor head 10, the flow will tend to remain attached to wall 42 of the reactor head provided that cone angle 22 is approximately 25° or less. In the embodiment disclosed herein, cone angle 22 of reactor head 10 is approximately 21°. The use of rotation vane 102 with conical reactor 10 advantageously increases the efficiency of the reaction and the useful life of the catalyst.

Figure 17:
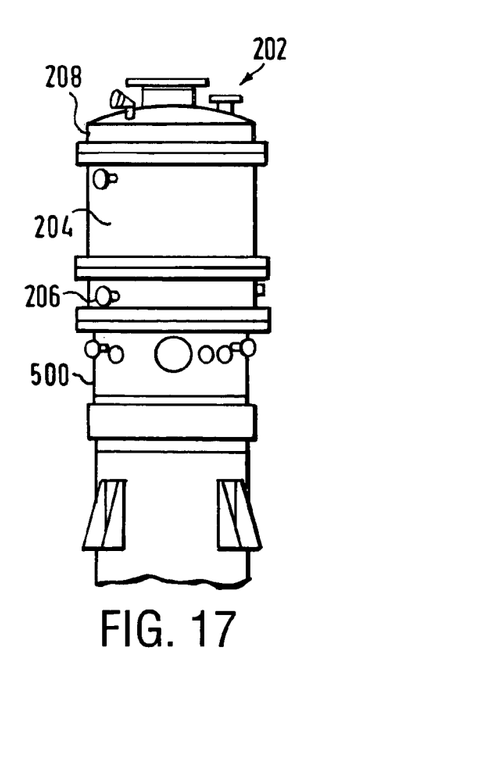
FIG. 17 is a front view of an alternative embodiment of a reactor in accordance with the present invention.

In some embodiments, a reactor such as reactor 202 as shown in FIG. 17 may replace conical reactor 10. Reactor 202 is a split-barrel (204 and 206) configuration connected to an existing head 208, but the same cooling system, barrel elevation, thermocouple nozzles, rotation vanes, and internal insulation disclosed above may be used with reactor 202. Reactor 202 may be coupled with a LAD or EHD to create an effective laminar flow similar to the flow created in conical reactor 10.

Figure 18:
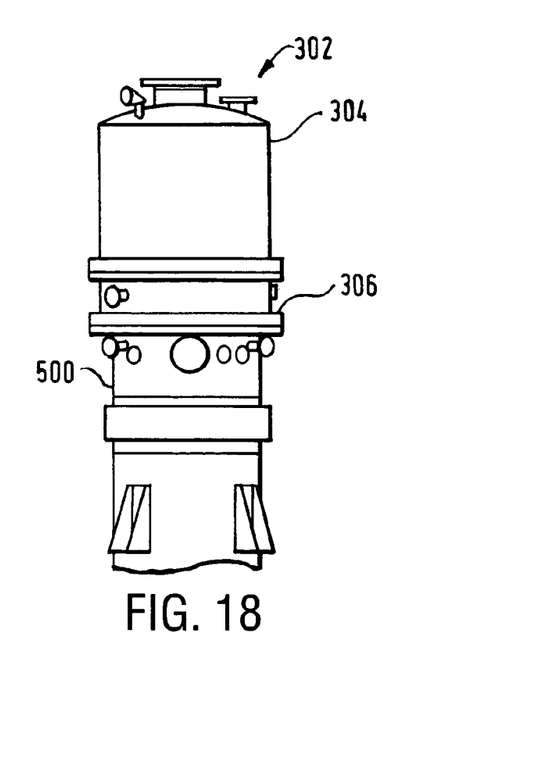
FIG. 18 is a front view of another alternative embodiment of a reactor in accordance with the present invention.

In addition, FIG. 18 discloses a third embodiment for a reactor 302 in accordance with the invention. Reactor 302 includes an elongated head 304 attached to a short barrel 306. Like reactor 202, reactor 302 may attach to barrel 52 and includes the same cooling system, barrel elevation, thermocouple nozzles, rotation vanes, and internal insulation disclosed above. Reactor 302 may also be coupled with a LAD or EHD to create a conical laminar flow similar to the flow created in conical reactor 10.

An alternative to the use of the LAD or EHD devices in domed heads 402 is shown in FIG. 20. Shown is the use of insulation 40 with a conical interior surface 43. Also shown is the use of a conical exit 45 (or more specifically, the use of insulation to provide a conical interior surface in the domed exit head as well.) The primary benefit of the conical exit is to create laminar flow such that pressure drop is minimized (turbulent/non-laminar flow creates eddies that increase pressure drop). It will be understood by one of skill in the art with the benefit of this disclosure that while the angle of inlet cone 43 is very critical, the exit angle or cone 45 is less critical and may be any angle greater than zero-degrees and less than 90-degrees. Also, while flanges 47 are shown in FIG. 20, these are optional and it is contemplated that refractory ceramic fiber insulation can be fabricated in pieces for easy insertion into flangeless vessels and then assembled inside the vessel to create a desired conical interior surface.

It is contemplated that reactors 10, 202, and 302 may be most useful for the production of hydrogen cyanide. The process for preparing hydrogen cyanide includes feeding reactants into a reactor (for example reactor 10, 202, or 303). The reactants include at least one hydrocarbon, at least one nitrogen containing gas, and at least one oxygen containing gas. It is to be understood that the oxygen containing gas may be the same as the nitrogen containing gas or the hydrocarbon.

The at least one hydrocarbon may be an aliphatic or substituted aliphatic, cycloaliphatic or substituted cycloaliphatic, or aromatic or substituted aromatic hydrocarbon or a mixture thereof. Suitable examples include, without limitation, methane ($CH_4$), ethylene ($C_2H_4$), ethane ($C_2H_6$), propylene ($C_3H_6$), propane ($C_3H_8$), butane ($C_4H_{10}$), methanol ($CH_3OH$), toluene, naphtha, and methyl formate. In a preferred embodiment, the at least one hydrocarbon is methane or a mixture of one or more hydrocarbons containing methane. The at least one nitrogen containing gas includes, without limitation, ammonia, formamide, or nitric oxide (NO). In a preferred embodiment, the at least one nitrogen containing gas is ammonia or mixtures of ammonia with one or more nitrogen containing gasses. The at least one oxygen containing gas may be any material containing an amount of oxygen suitable to maintaining combustion to provide heat for endothermic hydrogen cyanide formation. Suitable examples include, without limitation, air, oxygen-enriched air, pure oxygen gas, carbon monoxide (CO), carbon dioxide ($CO_2$), or mixtures thereof or oxygen containing compounds which upon decomposition would provide oxygen. Suitable examples include peroxides, ketones, ethers, and the like.

Also contemplated is the use of the disclosed reactors for other prior art, non-Andrussow-type HCN preparation methods, wherein energy for the HCN formation reaction is supplied from a source other than in-situ combustion. Examples of such processes include the Degussa B-M-A process, the Fluohmic process, and microwave-heated and induction heated processes.

The disclosed apparatus may also be used in other industrial processes including, but not limited to, production of nitric acid (including production by the ammonia oxidation process or an oxygen-enriched process), synthesis gas production, (meth)acrylic acid production, NOx abatement units, or any other process requiring high temperatures and pressures with an absorbent, catalyst, or heat exchanger. High pressures include anything greater than atmospheric pressure, while high temperatures include any temperatures greater than 60° C. In addition, the catalyst used may include, but is not limited to, a screen, a supported catalyst, a fluidized bed, or an Ion Exchange resin.

Finally, although the present invention has application to gas-processes, it will be understood by one of skill in the art with the benefit of this disclosure that the invention is not limited to gas-processes. Also contemplated in the present invention are industrial processes that include the use of liquids at high temperatures and/or high pressures.

While the present invention has been particularly shown and described with reference to a particular illustrative embodiment thereof, it will be understood by those skilled in the art that various changes in form and details may be made without departing from the spirit and scope of the invention. The above-described embodiment is intended to be merely illustrative, and should not be considered as limiting the scope of the present invention.

What is claimed is:
1. A process of producing hydrogen cyanide comprising:
   a) providing at least one hydrocarbon, at least one nitrogen containing gas, and at least one oxygen containing gas;

b) reacting the at least one hydrocarbon, at least one nitrogen containing gas, and at last one oxygen containing gas in an apparatus to form hydrogen cyanide, and c) supplying heat by a simultaneous combustion reaction with the at least one oxygen containing gas in the apparatus;

wherein the apparatus comprises:

an inlet piping section with a first cross-sectional dimension;

a downstream process section with a second cross-sectional dimension; and an inlet transition section connecting the inlet piping section and downstream process section;

wherein the inlet transition section comprises internal insulation comprising refractory ceramic fiber and wherein the internal insulation forms a conical interior surface within said inlet transition section.

2. The process of claim 1 wherein the inlet transition section comprises a domed geometry.

3. The process of claim 2 wherein the inlet transition section is a reactor head comprising a flanged connection to the downstream process section.

4. The process of claim 1 wherein the inlet transition section comprises a conical geometry.

5. The process of claim 4 wherein the inlet transition section is a reactor head comprising a flanged connection to the downstream process section.

6. The process of claim 1 further comprising one or more sight glass nozzles.

7. The process of claim 1, wherein a laminar velocity profile is achieved in the downstream process section using at least one of:

a) a sufficient length of straight pipe comprising the inlet piping section to provide laminar flow at an upstream end of the inlet transition section;

b) at least one flow straightener comprising a rotation vane and disposed within the inlet piping section;

c) a large angle diffuser at the upstream end of the inlet transition section;

d) an elliptical head diffuser at the upstream end of the inlet transition section; and e) a conical interior surface comprising the transition section.

* * * * *